United States Patent
Thomas et al.

(10) Patent No.: US 10,198,565 B2
(45) Date of Patent: Feb. 5, 2019

(54) SYSTEM AND METHOD FOR CANDIDATE PROFILE SCREENING

(71) Applicant: Tata Consultancy Services Limited, Mumbai (IN)

(72) Inventors: Annie Thomas, Bangalore (IN); Shalin Garg, Bangalore (IN); Sathish Vallat, Bangalore (IN); Mohammed Yousuf Shariff, Bangalore (IN); Shikha Tomar, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 205 days.

(21) Appl. No.: 15/082,482

(22) Filed: Mar. 28, 2016

(65) Prior Publication Data

US 2016/0292405 A1   Oct. 6, 2016

(30) Foreign Application Priority Data

Mar. 31, 2015  (IN) .......................... 1359/MUM/2015

(51) Int. Cl.
| | |
|---|---|
| *G06F 21/31* | (2013.01) |
| *G06Q 10/06* | (2012.01) |
| *G06Q 50/10* | (2012.01) |
| *G06F 17/30* | (2006.01) |
| *H04L 29/08* | (2006.01) |

(52) U.S. Cl.
CPC ...... *G06F 21/316* (2013.01); *G06F 17/30528* (2013.01); *G06F 21/31* (2013.01); *G06Q 10/063114* (2013.01); *G06Q 50/10* (2013.01); *H04L 67/10* (2013.01)

(58) Field of Classification Search
CPC ......... G06F 21/31; G06F 21/316; H04L 63/08
USPC .......... 726/27, 28, 29, 30; 705/320; 707/732
See application file for complete search history.

(56) References Cited

U.S. PATENT DOCUMENTS

| | | | |
|---|---|---|---|
| 8,782,042 B1* | 7/2014 | Cooke .............. | G06F 17/30572 707/729 |
| 8,943,047 B1* | 1/2015 | Carpio .................. | G06Q 10/06 707/723 |
| 9,218,468 B1* | 12/2015 | Rappaport ............. | H04L 51/32 |
| 9,654,594 B2* | 5/2017 | B'Far .................... | H04L 67/306 |

(Continued)

*Primary Examiner* — David J Pearson
(74) *Attorney, Agent, or Firm* — Finnegan, Henderson, Farabow, Garrett & Dunner LLP

(57) ABSTRACT

This disclosure relates generally to screening candidate profile, and more particularly to system and method for screening candidate profile. In one embodiment, the method includes dividing a candidate profile into a plurality of subset-profiles having subset-profile information of attributes of the candidate profile. The subset-profile information is mapped with target-profile information of a plurality of targets to identify a set of targets capable of screening the subset-profile information. Queries are provisioned to the set of targets for performing screening, and responses to queries are received from therefrom. An aggregated weightage associated with the responses is computed based at least on an extent of matching of the responses and a confidence score associated with each target of the set of targets. The aggregated weightage is compared with a threshold value of weightage to identify the subset-profile information as one of a valid information and an invalid information.

15 Claims, 4 Drawing Sheets

(56) References Cited

U.S. PATENT DOCUMENTS

| | | | |
|---|---|---|---|
| 2005/0176500 A1* | 8/2005 | Mathews | G06Q 20/206 463/29 |
| 2009/0150166 A1* | 6/2009 | Leite | G06Q 10/06 705/320 |
| 2010/0095374 A1* | 4/2010 | Gillum | G06Q 30/02 726/22 |
| 2011/0154209 A1* | 6/2011 | Fan | G06F 17/30867 715/736 |
| 2013/0179438 A1* | 7/2013 | Coldicott | G06Q 10/10 707/723 |
| 2014/0025741 A1* | 1/2014 | Shuster | G06Q 30/02 709/204 |
| 2014/0172835 A1 | 6/2014 | Stuart et al. | |
| 2014/0317003 A1 | 10/2014 | Shah | |
| 2016/0125360 A1* | 5/2016 | Ali | G06Q 10/1053 705/321 |

\* cited by examiner

SYSTEM AND METHOD FOR CANDIDATE PROFILE SCREENING

PRIORITY CLAIM

This U.S. patent application claims priority under 35 U.S.C. § 119 to India Application No. 1359/MUM/2015, filed on Mar. 31, 2015. The entire contents of the aforementioned application are incorporated herein by reference.

TECHNICAL FIELD

This disclosure relates generally to candidate profile screening, and more particularly to system and method for identity verification of candidate's profile using crowdsourcing platform.

BACKGROUND

Screening of candidate profiles can be performed for a variety of purposes by concerned authorities. For example, authorities responsible for issuing credit cards, driver's license, telephone number, and/or cellular number, approving loans, opening bank accounts, and so on, prefer to conduct a screening and verification of the profile of customers seeking such services.

The profile verification is done to mitigate certain prevalent risks such as identity theft. Identity theft involves stealing personal information of a victim and generating a fake identity without the knowledge of the victims. By the time the victim realizes the situation and raises a complaint, the damage is already done. The fake identity may be used for obtaining credit cards, loans, bank accounts, unauthorized withdrawals of cash, driver's license, new telephone number, or cellular number, and so on. Considering a sharp increase in identity theft incidents and sensitivity of the information being stolen, the profile verification should be performed in a stringent manner.

SUMMARY

Embodiments of the present disclosure present technological improvements as solutions to one or more of the above-mentioned technical problems recognized by the inventors in conventional systems. For example, in one embodiment, a processor-implemented method for candidate profile screening is provided. The method includes receiving, via one or more hardware processors, a request for screening of a candidate profile associated with a candidate. The candidate profile includes a plurality of candidate profile attributes. Further, the method includes dividing, via the one or more hardware processors, the candidate profile into a plurality of subset-profiles. Each subset-profile comprising subset-profile information is associated with one or more candidate profile attributes of the plurality of candidate profile attributes. Furthermore, the method includes validating, via the one or more hardware processors, the subset-profile information of one or more subset-profiles of the plurality of subset-profiles. The method for validating the sub-set profile information of a subset-profile includes mapping the subset-profile information associated with the plurality of subset-profiles with target-profile information of a plurality of targets to identify a set of targets from amongst the plurality of targets. A target of the set of targets capable of screening the subset-profile information of the one or more subset-profiles. The target-profile information includes at least one of real-time information and contextual information of the plurality of targets. The method for validating the sub-set profile information includes provisioning one or more queries to the set of targets to enable the set of targets to perform screening of the subset-profile information. Further, the method for validating the sub-set profile information includes receiving one or more responses to the one or more queries from the set of targets, wherein the one or more responses facilitates in validating the subset-profile information of the candidate profile. Furthermore, the method for validating the sub-set profile information includes computing an aggregated weightage associated with the one or more responses received from the set of targets. The aggregated weightage is computed based at least on an extent of matching of the one or more responses with the one or ore candidate profile attributes of the subset-profile information and a confidence score associated with each target of the set of targets. Also, the method for validating the subset-profile information includes comparing the aggregated weightage with a threshold value of the aggregated weightage to identify the subset-profile information as one of a valid information and an invalid information.

In another embodiment, a processor-implemented system for candidate profile screening is provided. The system includes at least one memory storing instructions and one or more hardware processors coupled to said at least one memory. The one or more hardware processors are configured by said instructions to receive a request for screening of a candidate profile. The candidate profile includes a plurality of candidate profile attributes. Further, the one or more hardware processors are configured by said instructions to divide the candidate profile into a plurality of subset-profiles. Each subset-profile comprising subset-profile information is associated with one or more candidate profile attributes of the plurality of candidate profile attributes. Furthermore, the one or more hardware processors are configured by said instructions to validate the subset-profile information of one or more subset-profiles of the plurality of subset-profiles. The subset-profile information associated with the plurality of subset-profiles is mapped with target-profile information of a plurality of targets to identify a set of targets from amongst the plurality of targets. A target of the set of targets capable of screening the subset-profile information of the one or more subset-profiles. The target-profile information includes at least one of real-time information and contextual information of the plurality of targets. One or more queries are provisioned to the set of targets to enable the set of targets to perform screening of the subset-profile information. One or more responses are received corresponding to the one or more queries from the set of targets. The one or more responses facilitates in validating the subset-profile information of the candidate profile. Furthermore, the one or more hardware processors are configured by said instructions to compute an aggregated weightage associated with the one or more responses received from the set of targets. The aggregated weightage is computed based at least on an extent of matching of the one or more responses with the one or more candidate profile attributes of the subset-profile information and a confidence score associated with each target of the set of targets. Also, the one or more hardware processors are configured by said instructions to compare the aggregated weightage with a threshold value of the aggregated weightage to identify the subset-profile information as one of a valid information and an invalid information.

In yet another embodiment, a non-transitory computer-readable medium having embodied thereon a computer program for executing a method for screening candidate profile is provided. The method includes receiving a request for screening of a candidate profile associated with a candidate. The candidate profile includes a plurality of candidate profile attributes. Further, the method includes dividing the candidate profile into a plurality of subset-profiles, Each subset-profile includes subset-profile information is associated with one or more candidate profile attributes of the plurality of candidate profile attributes. Furthermore, the method includes validating the subset-profile information of one or more subset-profiles of the plurality of subset-profiles. The method for validating the sub-set profile information of a subset-profile includes mapping the subset-profile information associated with the plurality of subset-profiles with target-profile information of a plurality of targets to identify a set of targets from amongst the plurality of targets. A target of the set of targets capable of screening the subset-profile information of the one or more subset-profiles. The target-profile information includes at least one of real-time information and contextual information of the plurality of targets. The method for validating the sub-set profile information includes provisioning one or more queries to the set of targets to enable the set of targets to perform screening of the subset-profile information. Further, the method for validating the sub-set profile information includes receiving one or more responses to the one or more queries from the set of targets, wherein the one or more responses facilitate in validating the subset-profile information of the candidate profile. Furthermore, the method for validating the sub-set profile information includes computing an aggregated weightage associated with the one or more responses received from the set of targets. The aggregated weightage is computed based at least on an extent of matching of the one or more responses with the one or more candidate profile attributes of the subset-profile information and a confidence score associated with each target of the set of targets. Also, the method for validating the subset-profile information includes comparing the aggregated weightage with a threshold value of the aggregated weightage to identify the subset-profile information as one of valid information and invalid information.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
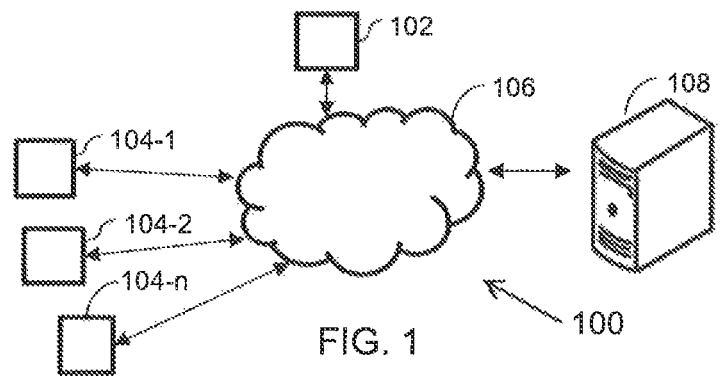
FIG. 1 illustrates a network implementation of a system for screening candidate profile according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present disclosure relates to a system and method for candidate profile screening. The disclosed method and system facilitates in automatically verifying the information provided by the candidates to authorities that are responsible for providing services/products to the customers upon being verified or screened. The system facilitates an authority to request for screening of profile information of a customer seeking their services and/or products, and in response, the system screens the customer profile to confirm the validity of the information provided by the customer. Examples of such authorities may include a financial institution such as a bank, an investment firm, a credit card issuing authority, a mobile number issuing authority, and so on. Hereinafter, the authority requesting for screening of profile information may be referred to as a 'requestor' or an 'authority'.

For screening of candidates, conventionally standalone identification verification systems are utilized, Such existing verification systems provide completeness check of photo-bearing document issued by official authority or standalone address verification being done physically. For example, in case a candidate applies for a loan or mortgage at a bank, a physical evaluation/verification is done by bank's field officers, agency or staff member to verify the candidate's identity and address based on the information provided by the candidate while filling up application for loan/mortgage. In an example scenario, the candidate can submit proof of address even without staying at said place. Such verification or screening is prone to error, and can thus be associated with a high risk of verification of incorrect information. Moreover, aforesaid method of screening is widely known, predictable and misused by the candidates, and therefore may not result in effective verification of the candidate profiles. Additionally, these methods of candidate profile verification involves high cost that is borne by the authorities such as banks while utilizing specialized services of the field agents/officers. Some of the challenges faced by the issuing authorities are described with reference to specific examples hereunder.

In an existing banking sector, to avoid identity theft, the issuing authority, i.e. the bank mandates new customers to fill a Customer Identification Documentation (generally referred to as Know-Your-Customer [KYC] form). Upon providing the information mentioned in the KYC form along with the supporting documents, the customer is entitled to open the bank account in said bank. However, one of the challenges faced by the bank authority is that there is just a completeness check being performed with respect to the KYC form and little or no verification of the documentation or the information provided in the KYC form is done by the bank authority. The existing methods and/or systems are inefficient in ascertaining whether the information provided in the form or documentation is true and not a fictitious or fake one.

Similar problems are faced in an online account opening process. Though there are various techniques for verifying the information but there is no verification method to ensure whether a person, providing the information, is really the one who he claims to be (i.e. the person described in the KYC form). For example, in the online account opening process, imaging schemes like Picture/Photo ID proof submission and subsequent OCR means are enabled to extract data or providing video chat or face recognition capabilities for automated identity verification. However, in such a system also, there is no way to verify the identity of the candidate and the address is actually the address where the candidate resides.

The present disclosure provides method and system to overcome above-mentioned technical problems recognized in conventional systems and present technological improvements as solutions to one or more of the above-mentioned technical problems. For example, in one embodiment a system for candidate profile verification is provided. Said system is capable of logically and selectively segregating (or partitioning) a candidate profile into multiple sub-profiles. Herein, it will be noted that the term 'profile' or 'candidate profile' may include various candidate profile attributes associated with a candidate. For instance, the candidate profile attributes may include, but are not limited to, personal information, identity information, issued identifiers, photographs, address details, character details, contact details, employment details, income tax details, proof of identity, proof of residence, utility bills, credit card statement, signatures, police records, health records, neighbourhood information, educational details, social media profile information, lifestyle information, hobbies of the candidate, and so on and so forth. For the brevity of description, the term 'candidate profile attributes' may be referred to as attributes in the description hereinafter.

The system may further identify a set of targets that may be responsible for verification of the attributes of each of the sub-profiles. When a requester (for example, an issuing authority) seeks for verification of a candidate profile, the system gathers corroborative evidence through a set of targets using a crowd-sourcing platform. The system may identify known and/or unknown targets in order to verify the identity in a covert or overt mode and to get a high confidence score for identity screening and/or verification. In an embodiment, the crowdsourcing or selection of targets for verification/screening of the candidate profile is based on learning algorithms that may learn most suitable targets for verification/screening of target profiles and/or sub-profiles. An advantageous feature of the disclosed system is that the system allows for selection of targets based on learning algorithms and allots the targets on-the-fly (in some scenarios, during a natural interaction between the candidate and the target), and accordingly there is little chance for the candidate to guess or influence the outcome of the disclosed crowd sourced screening and verification method.

Further, the system facilitates in encouraging trusted/existing customers of the issuing authority (or the requestor) who have been previously verified and other participants for a crowd-sourced initiative for verifying the profile of the candidate. In one aspect, the participants in crowd sourcing activity can be encouraged for participation by reward schemes. In one aspect, the targets may be ranked higher proportional to their participation in the identity verification using the disclosed system. In one embodiment, any target on the crowd-souring platform (acting as a target for a particular sub-profile of the candidate profile), who visits or passes by address of the candidate, may be encouraged by the system to contribute towards verification of the customer profile.

While aspects of described system and method for verifying profile information associated with a candidate, it may be implemented in any number of different computing systems, environments, and/or configurations, the embodiment's are described in the context of the following exemplary system.

Referring now to FIG. 1, a network implementation 100 of a system 102 for verifying profile information associated with the customer is illustrated, in accordance with an embodiment of the present disclosure. Although the present disclosure is explained by considering that the system 102 is implemented as a software program on a server, it may be understood that the system 102 may also be implemented in a variety of computing systems, such as a laptop computer, a desktop computer, a notebook, a workstation, a mainframe computer, a server, a network server, cloud, and the like. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a hand-held device, and a workstation.

The user devices 104 are communicatively coupled to the system 102 through a network 106. Herein, the user devices may refer to the devices held by the plurality of targets for enabling the targets to access the network to enable the verification of candidate profiles. Additionally or alternatively, the user devices may include device that may not be held by human targets but fixed autonomous/intelligent devices capable of performing verification of candidate profiles and/or sub-profiles. For example, the fixed target devices may include autonomous devices such as driverless cars, intelligent billboards, surveillance devices, cameras, drones, and so on. Said devices can be enhanced by analytics (such as predictive analytics, transactional analytics, and real-time analytics) and/or AI (Artificial Intelligence) engines. It will be noted that in the foregoing discussion, the term 'target' and/or 'target device' may be referred to include either or both of the devices held by human targets and the autonomous devices, as described above.

The network 106 is enabled to connect the system 102 with a requestor/authority 108. The requestor 108 is configured to communicate with the system 102, and request for performing the candidate profile screening and verification. The network 106 is further enabled to connect the system 102 with the targets 104 for enabling the system 102 to communicate with the plurality of target devices that are identified as a part of the crowd sourcing platform to perform the verification. In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like. Various components and functionalities of the system 102 are described further with reference to FIG. 2.

Figure 2:
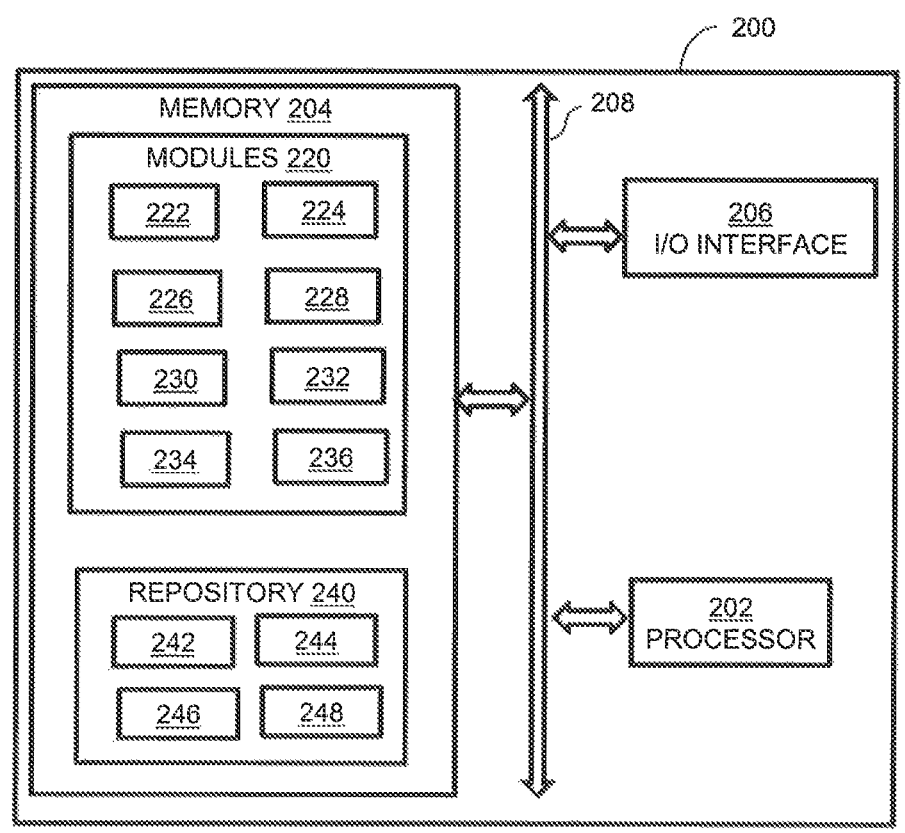
FIG. 2 illustrates a system for screening candidate profile according to some embodiments of the present disclosure.

FIG. 2 illustrates a block diagram of a system 200 for verification of candidate profile in accordance with an example embodiment. In an example embodiment, the system 200 may be embodied in, or is in direct communication with the system, for example the system 102 (FIG. 1). In an embodiment, the system facilitates the verification/screening of the candidate profile on a crowdsourcing platform. The system 200 includes or is otherwise in communication with one or more hardware processors such as a processor 202, at least one memory such as a memory 204, and an I/O interface 206. The processor 202, memory 204, and the network interface element 206 may be coupled by a system bus such as a system bus 208 or a similar mechanism.

The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 204.

The I/O interface 206 may include a variety of software and hardware interfaces, for example, a web interface, a graphical user interface, and the like. The I/O interface 204 may allow the system 200 to interact with a target directly or through the target devices 104. Further, the I/O interface 206 may enable the system 200 to communicate with other computing devices, such as web servers and external data servers (not shown). The I/O interface 206 may facilitate multiple communications within a wide variety of networks and protocol types, including wired networks, for example, LAN, cable, etc., and wireless networks, such as WLAN, cellular, or satellite. The I/O interface 206 may include one or more ports for connecting a number of devices to one another or to another server.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 204 includes a plurality of modules 220 and a repository 240 for storing data processed, received, and generated by one or more of the modules 220. The modules 220 may include routines, programs, objects, components, data structures, and so on, which perform particular tasks or implement particular abstract data types. In one implementation, the modules 220 may include a communication module 222, a subset-profile generation module 224, a mapping module 226, a query generation module 228, a query-response module 230, a computation module 232, a verification module 234, and other modules 236, The other modules 236 may include programs or coded instructions that supplement applications and functions of the system 200.

The repository 240, amongst other things, includes a system database 242 and other data 244. The other data 244 may include data generated as a result of the execution of one or more modules in the other modules 236. The repository 240 is further configured to maintain a candidate-profiles database 246 and a targets-database 248. The candidate-profiles database 246 is configured to store candidate-profile information of new users and/or candidates associated with the issuing authority (or the requestor) such as a bank. Further, the targets-database 248 is configured to store details of the plurality of the targets, for example, targets ($G_k$), linked with the crowd sourcing platform.

In an embodiment, the details of the plurality of targets may include profile information of the plurality of targets. The profile information of a target may be referred to as 'target-profile information', and may include at least one of real-time location information and contextual information associated with each target of the plurality of targets. In an embodiment, where the target refers to a human target having a device (such as the device 104 of FIG. 1), the contextual information may include attributes of registered user of the target device. In an embodiment, the attributes of the targets may include static attributes ($A_k$), verification parameters (Pkj), and preferences and/or constraints (Skp, Tkp) associated with respective targets. The static attributes may refer to those attributes that may remain unchanged or substantially unchanged over a period of time. For example, residential address of the target may be considered as a static attribute. The static attribute may include a plurality of verification parameters. For example, the residential address of the target may be composed of various verification parameters, such as house number, street, city, pin code, and so on.

Additionally, the attributes may include dynamic attributes. In an embodiment, the system 200 is also capable of tracking dynamic attributes and the verification parameters of the dynamic attributes. Said dynamic attributes and verification parameters may change over time. For example, a dynamic attribute of a target may include a travel path of the target that the target may traverse every day, for example while going to office. Said target may be traveling through a particular street every day, and said travel path of the target may be recorded with the system 200. Now, in case, the target starts taking a different travel path to reach same destination every day, the system 200 may track and update the changed travel path in the memory 204. The updated travel path may be recorded in the system 200 as an updated attribute (with updated verification parameters), and may be utilized further to identify the set of targets for verification of subset profiles. It will be understood that the attributes may be associated with personal information and/or professional information of the target.

In an embodiment, the preferences and/or constraints may be indicative of certain preferences of the targets and/or constraints imposed on/by the targets. For example, the preferences and/or constraints may be related to time, location and other such information. For instance, a target may have a preference or constraint to perform verification during a specific time period, such as only during night time or only during daytime or weekends or weekdays, and so on. As another example, a distance measure can be a preference or a constraint, for example, a target may have preference to perform verification or screening task only within 5 miles distance of the regular route that the target may take during a travel for office, or within certain miles around the target's place of residence. It will be noted that in different scenarios and with different targets, the constraints and/or preferences can be defined in a variety of manner, without restricting to examples of time and distance as described here.

In an example embodiment, the constraint may include multiple levels of constraints, for example, a first level of constraints, a second level of constraints and so on. The multi-level constraints may be applied while dividing the information into sub-profiles such that the sub-profile information is filtered in accordance with the levels of constraints while applying subsequent constraints. For example, at a first level global constraints may be applied to create multiple sub-profiles from the profile information. The global constraints may include constraints that may be applicable at a broad level to the profile information, for instance, to the information type to be verified. For example, in case the profile information/verification parameters to be verified includes sensitive information (such as bank account details, other financial details, and so on), then a constrain may be applied at the first level to select only certain type of targets who may be able to access said information of the candidate without risking the candidate's personal security and/or financial security.

In an embodiment, the target may include an autonomous device. In this embodiment, the contextual information may include, specific capabilities such as image capturing, video capturing, audio recording, customer and customer preference identification (in case of intelligent billboard), and so on. It will be noted that in addition to the contextual information, the system is capable of determining the real-time location of the targets. Accordingly, in one embodiment, the target-profile information may include the location information and the contextual information of the plurality of targets.

In one implementation, the multiple users may use the client devices to access the system 200 via the I/O interface 206. In an embodiment, the communication module 222 may accept inputs from the devices associated with the authority/requestor (for example, the requestor 108 of FIG. 1). These inputs may include profile information related to the candidate. In one embodiment, profile information may include a plurality of attributes. Examples of the attributes include identity information, photographs, address details, character details, neighbourhood information of the candidate, and so on. In one embodiment, a KYC document with candidate profile details may be received as input from the candidate, and same profile details/information is provided as input to the system 200. Further, the system 200 enables the communication module 222 to gather attributes including information of a set of activities associated with the candidate. The activities may include various types of events associated with the candidate. Such events may include attending a sports event, meeting other users, filling gas from a gas station, visiting a grocery store and the like.

In an embodiment, the attributes may be construed as verification parameters ($P_{ij}$). Each of the verification parameters (P) may be associated with an importance rating ($I_{ij}$) and a Sensitivity Level ($L_{ij}$). The importance rating associated with a verification parameter may be indicative of relevance of verification parameter whether it is mandatory or optional. For example, for one type of verification (for instance, for the purpose of education loan), the verification of verification parameters including school address can be of high importance, however, for other type of verification, the verification of the school may not be of high importance. The Sensitivity Level ($L_{ij}$) associated with the verification parameter may be indicative of sensitivity of the information of the verification parameter. For example, the sensitivity of a verification parameter such as a credit card number may be more than the sensitivity of a PAN number. In an embodiment, the sensitivity parameter may indicate a sensitivity level of the associated parameter. For instance, sensitivity levels may be categorized into levels such as level 1 (indicative of a highly secret information), level 2 (indicative of a confidential information), level 3 (indicative of an internal information), level 4 (indicative of a Private information), level 5 (indicative of a publicly available information), and so on.

The system 200 may divide the profile information of a candidate into a plurality of subset-profiles. In an embodiment, the subset-profile generation module 224 is configured to divide the profile information into a plurality of sub-profiles. Each sub-profile may include a plurality of candidate profile attributes of the candidate profile. In an embodiment, each sub-profile may include verification parameters of multiple attributes of candidate profile. For example, a sub-profile-1 may include verification parameter-1 and verification parameter-2 of attribute-1 of candidate profile, while a sub-profile-2 may include a verification parameter-3 and verification parameter-4 of the attribute-1. Herein, it will be noted that the sub-profiles may be generated so as to include one or more common verification parameters. For example, the sub-profile-1 may include verification parameter-1 and verification parameter-2 of attribute-1 of candidate profile, while a sub-profile-2 may include a verification parameter-2 and verification parameter-4 of the attribute-1. In this example, both the sub-profiles 1 and 2 include verification parameter 2. Herein, it will be noted that since the system 200 is capable of distributing common attributes or verification parameters of attributes in multiple sub-profiles, there is a greater chance for the same verification parameters or attributes to be verified by multiple targets, accordingly, the chances of effective verification of the sub-profile information is increased. In an embodiment, the candidate-profile information may be stored in the memory 204. Additionally or alternatively, the candidate-profile information may be gathered from sources coupled to the system 200. For instance, the system 200 may be embodied in a server that may gather the candidate-profile information from a server of the authority.

In an embodiment, the system 200 may divide the candidate-profile information into the plurality of subset-profiles based on a random categorization of the attributes into said subset-profiles. Alternatively, the system 200 may divide the profile information into the plurality of subset-profiles based on a logical categorization of the attributes into said sub-profiles. For instance, the system 200 may categorize the education details and employment details into one subset-profile on determination that the candidate's place of education and employment are in vicinity, and can be screened together. In another example, the system 200 may categorize the residential address details and photograph of the candidate into one subset-profile. It will be understood that the system 200 may employ a plurality of categorization rules for logical categorization of the attributes of the candidates into a plurality of subset-profiles.

In an embodiment, for each of the subset-profile, the system 200 may map the subset-profile information with the target-profile information of the plurality of targets. In an embodiment, the mapping module 226 is configured to map the subset-profile information with the target-profile information of the plurality of targets. In an embodiment, the mapping of the subset profile information with the target-profile information is performed to identify a set of targets that are capable of screening the subset-profile information of said subset profile. In an embodiment, the set of target are identified from the target-database 248 based on the mapping. In an embodiment, the set of targets may be selected from the crowd sourcing platform based on best effort basis models that learn through machine learning techniques.

In an embodiment, the system 200 is caused to configure a set of mapping rules ($R_{ip}$) for mapping the subset-profile information with the target-profile information. In an embodiment, the set of mapping rules may be configured to associate constraints and or preferences ($S_{ip}$), thresholds ($T_{ip}$) and target's verification parameters ($A_k$), to thereby identify most suitable targets for the task of subset-profile verification. In another example, a mapping rule for the verification of residence address of may be defined as any target ($G_k$) with home address ($A_k$ and $P_{kj}$). "within 1 mile" ($S_{ip}$ and $T_{ip}$) of the candidate's home address ($A_i$ and $P_{ij}$). Another mapping rule for the same verification may be defined as, any target ($G_k$) with entire daily driving route (dynamic $A_k$ and $P_{kj}$). "within 100 ft" ($S_{ip}$ and $T_{ip}$) of the candidate's home address ($A_i$ and $P_{ij}$). In another example, a mapping rule for selecting set of targets for verification may be defined based on social media information of the targets and the candidate. For example, the system 200 may check for relation between the target and the candidate by extracting social media information from the target's and candidate's social media profiles, and analysing the extracted social media information. The social media information may include contact lists, relationships, and other such information. If the system determines, based on the analysis of the social media information that the candidate and the target are not closely related, the system 200 may select said target for validating the candidate's profile information. Such mapping rules may enable the system 200 to utilize clustering techniques to find the best fit targets (Gk) (or the set of targets) for validation of candidate's attributes (Ai) of the sub-profiles. It will be noted herein that the mapping rules may be updated based on machine learning algorithms over a period of time.

In an embodiment, the mapping rules for selecting set of targets for verification may be defined based various conditions, for example, health of the target, number of times the target has performed verification over a time duration, number of verification tasks already assigned to the target, a home address of the target, and so on. In an example embodiment, the mapping rule related to the health of the target may enable identification of the health of the target to determine whether the target is capable of performing the verification based on health or stress levels thereof. In an embodiment, the target device held by the human target may include suitable sensors for determining the health and/or stress levels of the human target. In another embodiment, the mapping rule pertaining to the number of times the target has performed the verification may enable the system to track the verification tasks performed by the target in real time, and based on such tracking; the system 200 may determine whether to select the target for performing the verification. Additionally or alternatively, the system 200 may be capable of tracking the number of verification tasks already assigned to the target. Based on the number of tasks already assigned to the target, the system 200 may determine whether the assigned number of tasks are equal to the allowable number of tasks that can be given to a target at a given time. On determination that the tasks already assigned are equal to the allowable number of tasks, the system 200 may decide not to select said target. In another example, the mapping rule may be pertaining to the residential address of the target. For example, in case the residential addresses of the target and the candidate are determined to be same, the system 200 may not select such a target for verification of candidate profile information.

As discussed above, the system 200 may apply the preferences and/or constraints ($S_{kp}$, $T_{kp}$) associated with the target's profiles ($G_k$) to identify a set of targets from the plurality of target (the earlier best fit target list). The set of targets may be given the challenge or task of verification of the sub-profile. Upon applying the model on the attributes (verification parameters) of the sub-profiles, the system 200 may populate the set of targets in a list, such that the list includes best-fit targets {$G_{k1}, G_{k2}, \ldots$} for verification of the sub-profile information.

In an embodiment, the mapping can be performed, for example, based on a determination of targets that are trusted customers of the authority and/or that are previously verified and/or that have been residing in close proximity of the address or identity (profile data) of the candidate to be verified and/or various other such factors. For example, in case the subset-profile information includes a candidate's name and a place of job, the system 200 may map the information associated with the place of job to identify targets who may be frequently visiting that place or may also be working at the same place or a place in proximity of the place of job of the candidate. Similarly, in case the subset-profile information includes a sport's club being visited by the candidate frequently, then the targets for screening said subset-profile information can be identified by mapping the information of sports club with the target-profile information associated with said sports club. For example, system 200 can select the targets who are working in the sports club, intelligent bill boards installed outside or in vicinity to the sports club, any target having membership of said sports club, and so on based on the target-profile information of the targets. It will be noted that a new user and immediate family could be registered as targets on the crowdsourcing platform, however, for the verification of the candidate profile, the new user or immediate family of the candidate may not be considered to be the targets.

In an embodiment, the system 200 may identify the sub-profile information for a plurality of sub-profiles associated with the candidate profile to populate multiple lists of best-fit targets corresponding to said sub-profiles. The system 200 may further identify the targets that may appear in said multiple lists, and compute an index indicating a degree of acquaintance ($U_k$) between the target and the candidate. In an embodiment, the system y compute the degree of acquaintance ($U_k$) based at least on the sensitivity level and importance level associated with the attribute for lists corresponding to which the target profile is identified. In an embodiment, the degree of acquaintance ($U_k$) may be determined as below:

$Uk$={Sum of ($L_{ij}*I_{ij}$) for each list ($G_{k1}, G_{k2} \ldots$) the target appears in}/number of lists in which target is present In an embodiment, the system 200 may generate one or more queries corresponding to the subset-profiles. In an embodiment, a query generation module 228 is capable of generating the one or more queries corresponding to the subset-profiles. The set of questions/queries is aimed for verifying the information in the subset-profile. In an embodiment, the system may formulate the queries ($Q_{kj}$) for each of the set of targets. In an embodiment, the queries may be formulated for each target of the set of targets corresponding to attribute and verification parameter ($A_i$, $P_{ij}$). In an embodiment, said queries may also be associated with a difficulty level ($D_{kj}$) along with an importance Rating ($I_{ij}$) and Sensitivity Level ($L_{ij}$) of the Verification Parameter ($P_{ij}$). In an embodiment, the difficulty level of "Find Data" type of queries may be higher than "Validate Data" type of queries. For instance, a first query may be "What is C's home address?", a second query may be "Is C's Home Address $AN_{ij}$?" and a third query may be "Who stays at the Address ANij?" Herein, the difficulty level of the first query may be highest while that of the second query may be lowest.

In an embodiment, the system may be configured to present queries with high difficulty levels to those targets that are determined to be associated with high degree of acquaintance ($U_k$), than those target that may be determined to be associated with a lower degree of acquaintance ($U_k$). In an embodiment, the system 200 may identify targets having the degree of acquaintance ($U_k$) above an upper threshold level of degree of acquaintance, and in response, the system may disregard the identified target profile for verification. For example, in case a target is appearing in each of the multiple lists, then it may be construed as a target with abnormally high degree of acquaintance (above the upper threshold level of the degree of acquaintance). In another embodiment, the system 200 may be configured to accept targets for verification which may be associated with a degree of acquaintance occurring within a specific threshold range (for example within a range of an upper threshold and a lower threshold).

In an embodiment, the queries may include at least one of challenge-response questions, picture, text input, Yes and No options, multiple choice questions, voting options, partial data entry, and the like. The queries/questions may be of appropriate complexity level for example, simple, medium, hard, and so on. The queries can be associated with the diversity of targets. The targets may not have specialization in a particular domain/technology or proficiency to be part of the system 200. In an embodiment, the queries may be directed towards assigning tasks to the targets on interest areas thereof and proximity to said targets to the sub-profile information to be verified. Such a distribution of the queries to the targets that can allow for diversity of participation of targets, and their inclination to participate in the crowdsourced verification. In an embodiment, the targets may be provided with an option to deny the participation in the crowdsourced verification process.

In an embodiment, the one or more queries may be generated in response to a trigger notification. For example, in certain cases, the targets can be a combination of a human target and an autonomous device or a combination of multiple autonomous devices. For instance, in an example scenario, the sub-profile information may include picture of the candidate that needs to be screened. The system may select/identify a combination of swipe card of the candidate and a camera installed at the office of the candidate as the targets. As soon as the candidate swipes his/her card at the office swipe machine, the system may generate a trigger notification for informing the camera device installed in the office premises to capture the photograph of the candidate. Herein, the information to the camera may be assumed to be query/question. The camera device can capture the image of the candidate and send the same to the system 200 for validation. The image captured by the camera can be assumed to be the response to the query. Various other scenarios may be possible where a target can be a combination of human target and an autonomous device or a combination of multiple autonomous devices. It will be noted that the trigger can be generated in real-time. Alternatively the trigger can be unplanned/anticipated/offline engagement with the candidate.

The set of queries ($Q_{kj}$) are then transmitted to the set of target in order to gather inputs from each of the set of target. In an embodiment, the query-response module 230 is configured to transmit the one or more queries to the set of target users and receive a set of responses ($ANk_{ij}$) corresponding to the queries ($Q_{kj}$) from the target using the communication network 106.

In an embodiment, the system 200 assigns individual weightages to each of the one or more responses received from the each target based at least on the extent of matching of the one or more responses with the one or more attributes of the sub-profile information and a confidence score associated with each target. The confidence score associated with a target may be indicative of a probability of accuracy of responses provided by the target. In an embodiment, the system 200 may assign the confidence scores for each of the target profiles based on the previous responses provided by said targets, promptness in providing the response, correctness of the responses, difficulty levels of the queries assigned to said targets for which the responses were provided previously, and other such factors that may indicate a confidence to assign the queries to the targets. Additionally or alternatively, the confidence scores may be assigned based on the target-profile information of the targets that may be previously screened successfully by the system 200. In an embodiment, the system 200 may detect the confidence score of the set of targets, and may override the responses received from the targets having lower values of confidence score with the responses received from the targets having higher values of confidence score.

An example of computation of the confidence score is given below. For example, the system may receive responses $ANk_{ij}$ from the set of targets. The system may normalize the answers ($ANk_{ij}$), and determine ($FN_{kij}$) whether the Answer ($AN_{ij}$) given by a target (C) of the set of targets is true or false with respect to the responses from other targets of the set of targets ($G_k$). The system may assign a positive score to each 'True' response, and a negative score to each 'False' response, Based on such assignment of scores, the system may compute a final score for the verification conducted by the set of targets.

In an embodiment, the system 200 may compute an aggregated weightage associated with the one or more responses based on the individual weightages of the one or more responses. In an embodiment, the aggregated weightage may be computed by taking an average mean of the individual weightages. In an embodiment, the aggregated weightage may be computed by the computation module 232.

In an embodiment, the system 200 may compare the aggregated value of weightage with a threshold value to determine whether the sub-profile information is valid or invalid. In an embodiment, a verification module 234 may compare the aggregated value of weightage with the threshold value to determine validity of the sub-profile information. The system 200 may determine whether the aggregated weightage is greater than or equal to a threshold value of the weightage. In case, it is determined that the weightage assigned to the subset-profile is greater than or equal to the threshold value of the weightage, the system 200 may identify the subset profile information as valid profile information. If, however, the weightage assigned to the subset-profile is determined to be less than the threshold value of the weightage, the system 200 may identify said profile-information as invalid profile information.

In an example embodiment, the profile-information associated with a sub-profile may be considered as valid when:

$$\text{Sum of } \{Uk^*(+1 \text{ if True or else } -1 \text{ if false})\} > (\text{a threshold value } T_{ip})$$

Herein, the value of the threshold $T_{ip}$ may be determined during the configuration of the Rules ($R_{ip}$).

In an embodiment, the system may be caused to identify the targets that have provided responses in favor of the output generated corresponding to the sub-profile verification at the system. The system 200 may further be caused to increment the confidence score associated with the identified targets. Additionally or alternatively, the system 200 may be caused to decrement the confidence score associated with the targets that responded otherwise. In an embodiment, the said increment and decremented of confidence score may be applied by an equal value.

In an example embodiment, the verification of the sub-profile may be considered as invalid in case the Sum of {Uk*(+1 if True or else −1 if false)}<threshold value $T_{ip}$ In an embodiment, on determination of the verification of the sub-profile as invalid, the system may be caused to intimate the candidate via a notification for re-validation of the sub-profile information. Additionally or alternatively, the system may expand the number of targets in the plurality of targets (Gk), and again attempt the validation of the candidate profiles for the subset-profile Parameters for which verification is determined to be invalid.

In an embodiment, the system 200 may generate a report for providing the validation status of the sub-profile information. In a similar manner, all the plurality of sub-profiles of the candidate profile may be analysed using the system 200. In an embodiment, the system may display a screening status for each attribute of the plurality of attributes and a last verified timestamp associated with screening of said attribute. The system 200 aims to solve the need for increased regulatory scrutiny and compliances to encourage checks such as Anti-Money Laundering (AML), Foreign Account Tax Compliance Act (FATCA) reporting, Customer Identification Program/Procedure (CIP) and country-specific regulatory reporting and compliance. Further, the system may encourage identity verification checks at regular intervals to detect changes in the profile information of the candidate such as address change and the like. The process of screening and verifying the profile information provided by the candidate is further explained with respect to the flowchart of FIG. 3.

Figure 3:
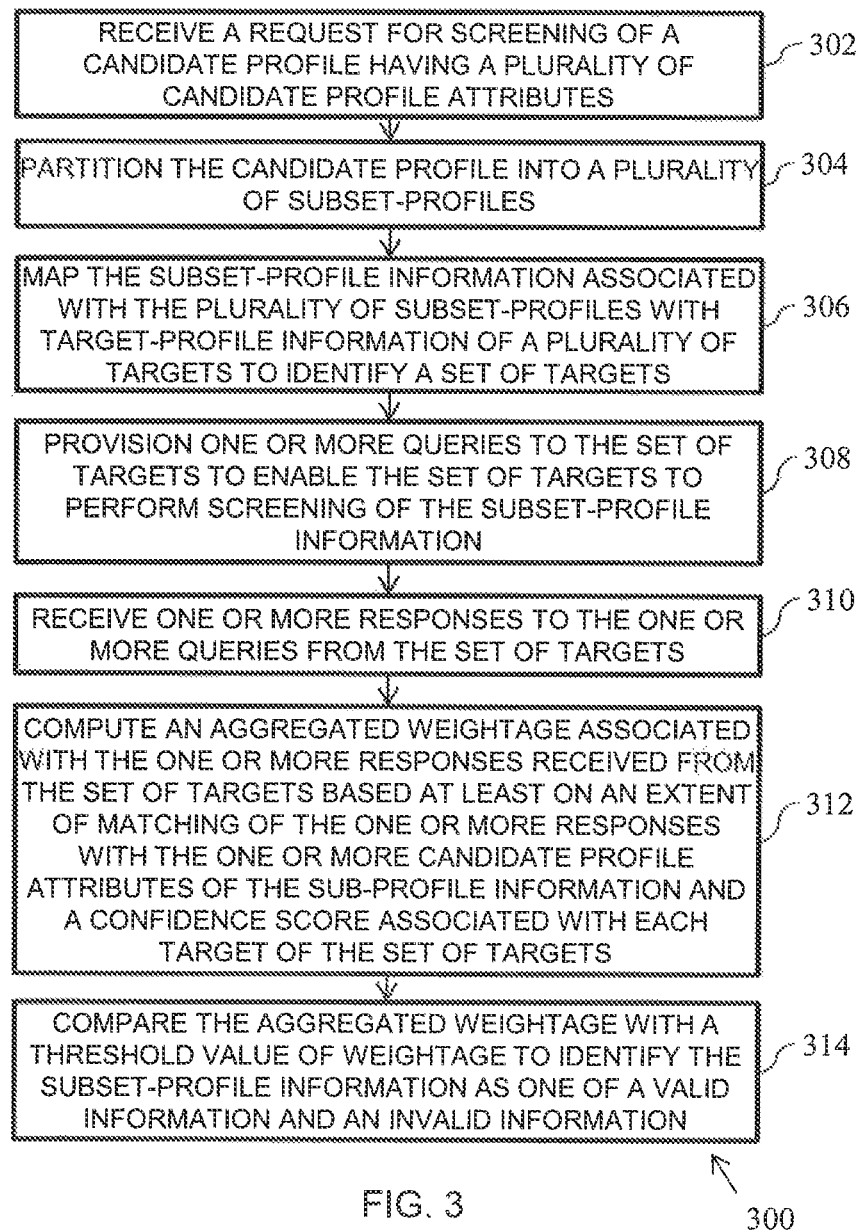
FIG. 3 illustrates a flowchart for screening candidate profile in accordance with some embodiments of the present disclosure.

FIG. 3 illustrates a flowchart 300 for screening of candidate profile, in accordance with an example embodiment. In an embodiment, the candidate profile is screened by a system, for example, the system 200 (FIG. 2). In an embodiment, the system 200 utilizes a crowd sourcing platform for screening of the candidate profile.

At 302, a request for screening of a candidate profile is received at the system 200. In an embodiment, the candidate profile may include a plurality of candidate profile attributes. Examples of said attributes may include identity information, photographs, address details, character details, contact details, employment details, tax details, proof of identity, proof of residence, utility bills, credit card statement, signature, and neighbourhood information of the user. In an embodiment, the candidate profile attribute includes a plurality of verification parameters, such that a verification parameter of the plurality of verification parameters is associated with an importance rating and a sensitivity level. The importance rating of the verification parameter may be indicative of relevance of the verification parameter to determine if the verification parameter is mandatory or optional for verification of the sub-profile information. The sensitivity level associated with the verification parameter may be indicative of sensitivity of sub-profile information associated with the verification parameter.

At 304, the candidate profile is divided into a plurality of subset profiles having sub-profile information associated with one or more candidate profile attributes. In an embodiment, the candidate profile is divided into the plurality of subset profiles subset-profile generation module 224 of the system 200. In an embodiment, each subset-profile of the plurality of subset-profiles includes subset-profile information associated with one or more attributes of the plurality of attributes.

At 306, the subset-profile information of one or more subset-profiles of the plurality of subset-profiles is validated. The sub-set profile information of a subset-profile is validated by performing steps 308-316.

At 308, the subset-profile information associated with the plurality of subset-profiles is mapped with target-profile information of a plurality of targets. For example, a subset profile may include the address of the candidate. The system may then match the address of the target with the address information of the plurality of targets to identify those targets that stay in the vicinity of the candidate's address. Alternatively, the system may determine the patterns established through the commute behaviour of the targets to identify the targets that may often be visiting the vicinity of said address. Similarly, the system can identify a person as an target who regularly passes through a certain route could become a "potential" agent for a candidate residing at an address in that route.

A target of the set of targets is capable of screening the subset-profile information of the one or more subset-profiles. The target-profile information includes at least one of real-time information and contextual information of the plurality of targets. In an embodiment, the request for screening of the candidate profile is received by the communication module 222 (FIG. 2).

In an embodiment, a target may be a hand-held device. In the present embodiment, the contextual information of the target includes attributes of registered user of the hand-held device. Examples of the attributes of the registered user of the hand-held device may include static target attributes, dynamic target attributes, target verification parameters, and target constraints. In an embodiment, the target constraints may include multi-level constraints. The multi-level constraints can be selectively applied to the plurality of targets for identifying the set of targets. In another embodiment, the target may be a fixed device. In this embodiment, the contextual information of the target may be the device information of the fixed device.

In an embodiment, to identify the set of targets, the contextual information of the plurality of targets is associated with the plurality of verification parameters of the subset-profile information based on a plurality of mapping rules. Based on said association, a plurality of lists of targets are identified from the plurality of targets. Each list of the plurality of lists includes one or more targets capable of screening one or more verification parameters of the plurality of verification parameters. Further, a degree of acquaintances is computed between each target of the plurality of lists of targets based on a frequency of occurrence of said targets in the plurality of lists. The set of targets is selected from the plurality of lists of targets based on a comparison of said degree of acquaintances with a plurality of threshold values of the degree of acquaintance. In an embodiment, the plurality of threshold values defines a range of the degree of acquaintance within which the degree of acquaintance can assume an acceptable value. In an embodiment, the plurality of threshold values may include at least an upper level of the degree of acquaintance and a lower level of the degree of acquaintance. As such the degree of acquaintance below the lower level of threshold value may not be acceptable, and hence the system may not select the target having the degree of acquaintance below the lower level of threshold value as the target for verification. Alternatively, the system may select the target having degree of acquaintance below the lower level of threshold value as the target for verification, however, the system may assign questions of relatively less difficulty to such targets.

In an embodiment, the target having degree of acquaintance above the upper level of threshold value may not be selected as the target for verification. Alternatively, the system may select the target having degree of acquaintance higher than the upper level of threshold value as the target for verification, however, the system may assign questions of relatively very high difficulty to such targets.

At 310, one or more queries are provisioned to the set of targets to enable the set of targets to perform screening of the subset-profile information. At 312, one or more responses to the one or more queries are received from the set of targets. The one or more responses facilitates in validating the subset-profile information of the candidate profile. In an embodiment, the one or more queries can be at least one of challenge-response questions, picture, text input, Yes and No options, multiple choice questions, voting options, and partial data entry. For example, in one scenario, the system may identify the targets to be a person working in the same office complex as that of the candidate. In such a scenario, the system may send a query to the target to click a picture of the candidate and send the same. On receiving such a query, the target may click a picture of the candidate and send the same to the system through a mobile thereof in response to the query.

At 314, an aggregated weightage associated with the one or more responses received from the set of targets is computed. The aggregated weightage may be computed based at least on an extent of matching of the one or more responses with the one or more candidate profile attributes of the subset-profile information and a confidence score associated with each target of the set of targets. In an embodiment, the confidence score associated with a target is indicative of a probability of accuracy of responses provided by the target. In an embodiment, the confidence score may be computed based on at least one of past history of responses provided by the target, promptness in providing the responses, correctness of the responses, and difficulty level of previous queries assigned to the target. In an embodiment, the system may identify a target of the set of targets having highest confidence score. The system may override the one or more responses to the one or more queries received from the set of targets with a response provided by the target having a highest confidence score.

At 316, the subset-profile information is identified as one of valid information and an invalid information based on a comparison of the aggregate weightage with a threshold value of weightage. In an embodiment, on determination that the weightage assigned to the subset-profile information is greater than or equal to the threshold value of aggregate weightage, the subset-profile information may be identified as valid profile information. If however, the weightage assigned to the subset-profile information is less than the threshold value of aggregate weightage, the subset-profile information may be identified as invalid profile information.

In an embodiment, a screening report may be generated based on the comparison between subset-profile information and the corresponding inputs received from the set of target user. In a similar manner, all the sub-profiles from the plurality of sub-profiles is analyzed using the crowd sourcing platform for verifying the profile data associated with the candidate.

A significant outcome of the disclosed screening and verification method is the discovery of anomalies in a specific verification profile based on incoherent response for specific sub-profiles, submitted by different targets, which would bring it to attention of authorities for due diligence and manual verification. The verification of Fraudulent ID, Address proof, Shell companies, Non-established linkages of historic verification data and current verification data by the disclosed system 200 leads to detection of "Synthetic" Identity Theft.

Figure 4A:
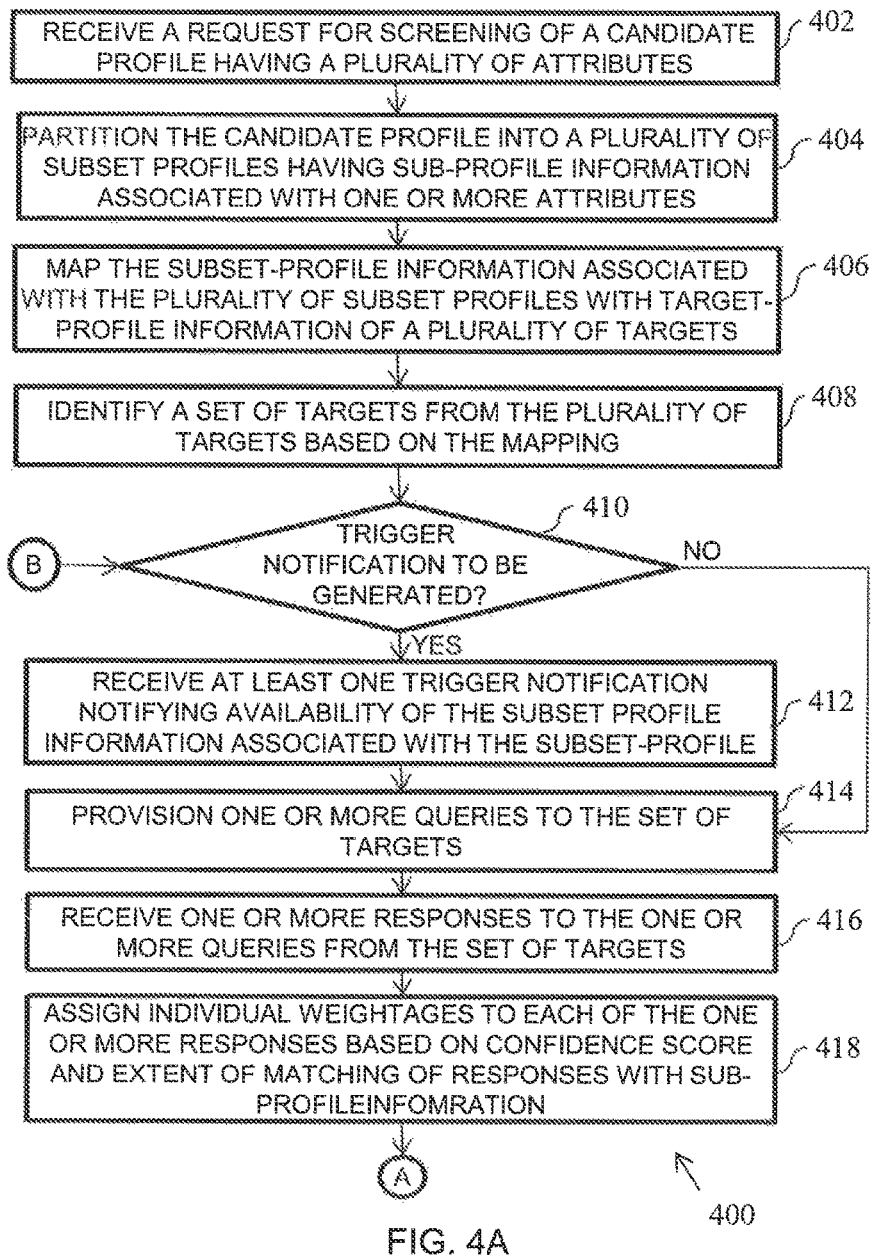
FIGS. 4A and 4B illustrate a flowchart for screening candidate profile, in accordance with another embodiment of the present disclosure.
Figure 4B:
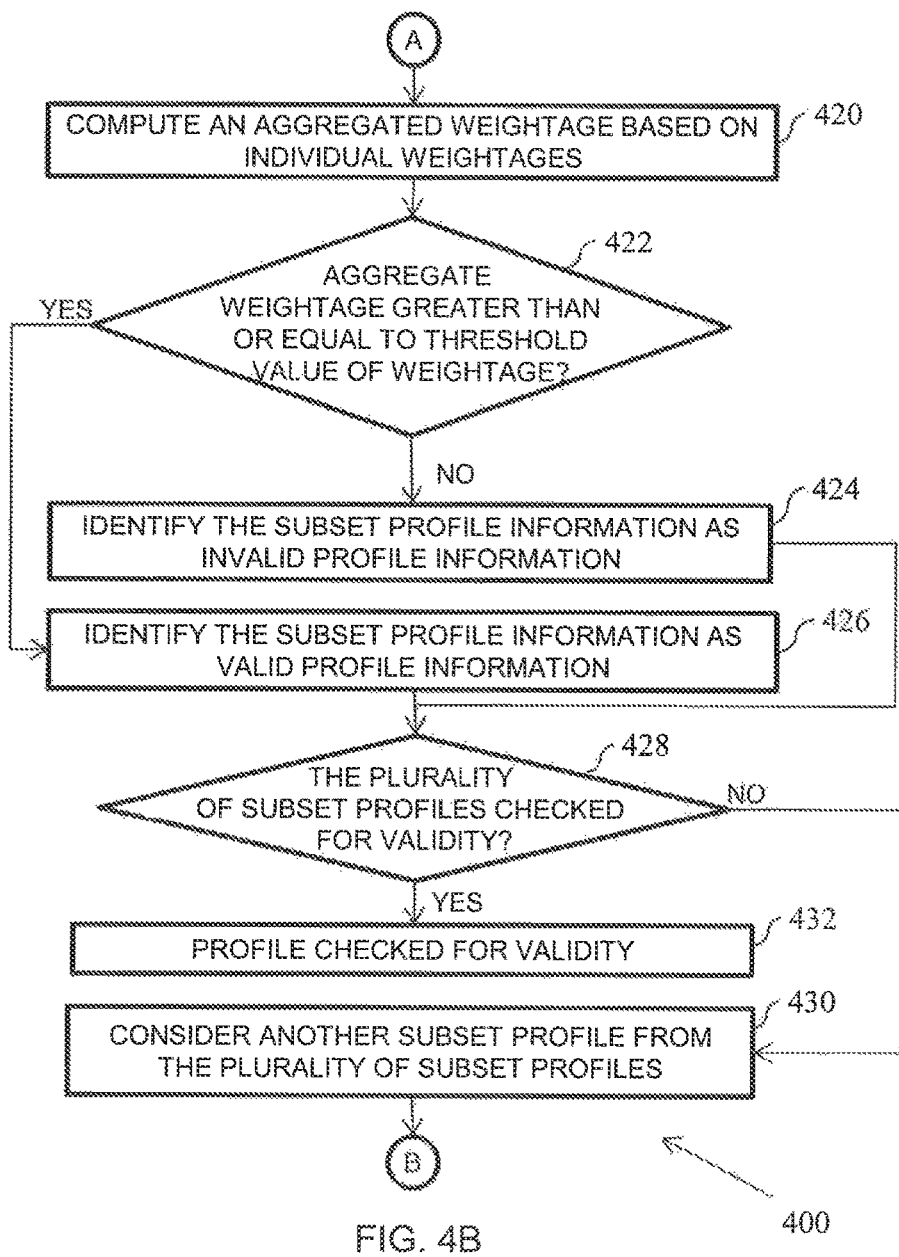

FIGS. 4A and 4B illustrate a flowchart 400 for screening of candidate profile, in accordance with an example embodiment. In an embodiment, the candidate profile is screened by a system, for example, the system 200 (FIG. 2). In an embodiment, the system 200 utilizes a crowd sourcing platform for screening of the candidate profile.

At 402, a request for screening of a candidate profile is received at the system. In an embodiment, the candidate profile may include a plurality of attributes such as personal information, professional information, social media information, educational information, and so on. At 404, the candidate profile is partitioned into a plurality of subset profiles having sub-profile information associated with one or more attributes. At 406, the subset-profile information associated with the plurality of subset profiles is mapped with target-profile information of a plurality of targets. At 408, a set of targets from the plurality of targets is identified based on the mapping.

At 410, it is determined whether a trigger notification is required for screening the subset profile. In an embodiment, the trigger notification may be provided by a trigger device on occurrence of an event. In an embodiment, the trigger may be provided during a "unplanned" engagement of the candidate with the target, or an anticipated engagement of the candidate with the target, or could be offline engagement of the candidate with the target. In other words, an event may act as a trigger for a trigger device to generate a trigger notification. If it is determined at 410 that the trigger notification is available, the system may receive the trigger notification at 412, to thereby notify availability of the subset profile information associated with the subset-profile. On receipt of the trigger notification, the system may provision one or more queries to the set of targets to enable the set of targets to perform screening of the subset profile information, at 414. In an embodiment, in case it is determined at 410 that the trigger notification is not required (meaning thereby that the interaction of the candidate and the target is not offline or unplanned or anticipated), the system may directly provision the one or more queries to the set of targets at 414. In an embodiment, the set of targets may provide responses to the one or more queries, which may be received at 416 at the system.

At 418, individual weightages may be assigned to the one or more responses received from each of the set of targets. In an embodiment, the individual weightages are assigned based on the confidence score of the respective targets and an extent of similarity between the responses received and the sub-profile information provided by the candidate. At 420, an aggregated weightage is computed for the responses based on the individual weightages.

At 422, it is determined whether the aggregated weightage is greater than or equal to a threshold value of weightage. If it is determined that the aggregated weightage is greater than or equal to the threshold value of weightage, the system may identify the subset profile information as valid profile information, at 424. If however, the aggregated weightage is determined to be less than the threshold value of weightage, the system may identify the subset profile information as invalid profile information at 426.

At 428, it is determined whether the plurality of subset profiles are checked for validity. If it is determined that the plurality of subset profiles are not checked for validity, the system may consider another subset profile from the plurality of subset profiles at 430. Further the system may screen the sub-profile information by following method 410-428 till the screening of the plurality of subset-profiles of the candidate is completed. Once it is determined that no more sub-profiles are available for screening, it may be determined at 432 that the candidate profile is checked for validity.

Example Scenario

In one example, the disclosed method and system may facilitate in verifying the identity of a new user before opening bank-account by using a crowd sourcing platform. The user (or the candidate) may provide documents for identity proof and address proof and fill in details in a know-your-customer (KYC) form. After submitting the documents, the system 200 analyses the KYC form as well as identity proof and address proof to generate profile data associated with the new user. The KYC form includes the candidate profile information such as personal information including photograph, Government ID, phone number, mobile number, social media profile ID, present address, permanent address, and so on. Additionally, the profile information may include activities usually performed by the candidate. Examples of such activities may include visiting restaurants on weekends, calling friends at home, filling gas from a nearby gas station, visiting a grocery store in nearby vicinity and the like.

Prior to opening the bank account, the issuing authority for example, the bank may initiate a verification process by accepting the profile information of the candidate. In an example embodiment, the candidate profile information may include attributes such as residential address (A1), office address (A2), name (A3), card number (A4), and club membership card number (A5). The attributes may include one or more verification parameters. In an embodiment, the system may be able to associate metadata associated with the verification parameters. An example of the metadata is illustrated in the table 1 below:

TABLE 1

| Attribute# | Attribute | Verification Parameter | Usage | Sensitivity | Date/Time | Radius | GPS | Target | Associated Attributes |
|---|---|---|---|---|---|---|---|---|---|
| | | | | Metadata associated with verification parameter | | | | | |
| A1 | R | P1 | M | Level 4 | Any | 100 m | — | H | Color, Neighborhood, |
| | | P2 | M | Level 5 | Any | <0.5 km PV, NA for EV | Y | H, NH | Famous landmark(s) near to the address, |
| | | P3 | O | Level 5 | Any | <0.5 km PV, NA for EV | Y | H, NH | Google Map PIN, Street address, |
| | | P4 | O | Level 5 | Any | <15 km PV, NA for EV | Y | H, NH | Distance units from Point A to specified |
| | | P5 | O | Level 5 | Any | <30 km PV, NA for EV | Y | H, NH | Address (by drive, by walk), Terrain, Traffic |
| | | P6 | O | Level 5 | Any | <0.5 km, PV, NA for EV | Y | H, NH | conditions (Regular), Traffic conditions |
| | | P7 | M | Level 5 | Any | NA | Y | H, NH | influencing by nearby |
| | | P8 | M | Level 5 | Any | NA | Y | H, NH | events |
| | | P9 | M | Level 5 | Any | NA | Y | H, NH | |
| | | P10 | M | Level 5 | Any | NA | — | H, NH | |
| A2 | Office Address | P11 | M | Level 4 | Any | 500 m | — | H | Color, Neighborhood, |
| | | P12 | M | Level 5 | Any | NA for PV, NA for EV | Y | H, NH | Famous landmark(s) near to the address, |
| | | P13 | O | Level 5 | Any | NA for PV, NA for EV | Y | H, NH | Google Map PIN, Street address, |
| | | P14 | O | Level 5 | Any | NA for PV, NA for EV | Y | H, NH | Distance units from Point A to specified |
| | | P15 | O | Level 5 | Any | NA for PV, NA for EV | Y | H, NH | Address (by drive, by walk), Terrain, Traffic |
| | | P18 | O | Level 5 | Any | NA for PV, NA for EV | Y | H, NH | conditions (Regular), Traffic conditions |
| | | P17 | M | Level 5 | Any | NA | Y | H, NH | influencing by nearby |
| | | P18 | M | Level 5 | Any | NA | Y | H, NH | events |
| | | P19 | M | Level 5 | Any | NA | Y | H, NH | |
| | | P20 | M | Level 5 | Any | NA | — | H, NH | |
| A3 | Name | P21 | M | Level 3 | Any | NA | — | H | Nick name, Mapping |
| | | P22 | M | Level 4 | Any | NA | — | H | name to face |
| | | P23 | M | Level 4 | Any | NA | — | H, NH | (physical attributes of |
| | | P24 | O | Level 2 | Any | NA | — | H | a person) |
| A4 | Card # | P25 | M | Level 2 | Any | NA | — | H, NH | Add-on card details, C |
| | | P26 | M | Level 2 | Any | NA | — | H, NH | affiliated picture |
| | | P27 | M | Level 2 | Any | NA | — | H, NH | background branding, |
| | | P28 | M | Level 2 | Any | NA | — | H, NH | Co-brand |
| | | P29 | M | Level 2 | Any | NA | — | H, NH | |
| A5 | Club detail | P30 | M | Level 2 | | NA | — | H, NH | Add-on card details, |
| | | P31 | M | Level 2 | | NA | — | H, NH | Membership details, |
| | | P32 | M | Level 2 | | NA | — | H, NH | Fees |
| | | P33 | M | Level 2 | | NA | — | H, NH | |
| | | P34 | M | Level 2 | | NA | — | H, NH | |

As illustrated in Table 1, the attribute (A1) residential address may include verification parameters such as door number (P1), address line 1 (P2), address line 2 (P3), Town (P4), State/County/Province (P5), Landmark (P6), City (P7), Zip Code (P8), Country (P9), and Phone Number (P10). Also, the attribute (A2) office address includes door number (P11), address line 1 (P12), address line 2 (P13), Town (P14), State/County/Province (P15), Landmark (P16), City (P17), Zip Code (P18), Country (P19), and Phone Number (P20). In addition, the attribute (A3) name may include verification parameters First name (P21), surname (P22), photo (P23), alias name (P24). Also, the attribute (A4) card number includes issuer and affiliate (P25), first name (P26), sirname (P27), expiry date (P28), and last 4 digits of card number (P29). Further, the attribute (A5) club membership card number includes issuer (P30), first name (P31), Last name (32), expiry date (P33), and last 4 digits of card number (P34).

Further referring to Table 1, the metadata associated with the verification parameters includes usage, sensitivity, date/time, radius or distance from the target, GPS, target, and other associated attributes. Herein, it will be noted that the metadata may be representative of the contextual information associated with the plurality of targets. In table 1, the target can be a human (H) or a non-human (NH). Also, the notations EV and PV in the radius metadata stand for electronic verification and physical verification, respectively.

In one embodiment, the system 200 may determine whether the new candidate's identity verification is previously performed or not. If the identity screening is previously performed by the system 200, then the system may display the screening status for each attribute and a last verified timestamp corresponding to the said attribute. In case the candidate's identity is not previously verified or screened, a request may be placed in the system 200 for selecting the attributes for verification. In case of refreshing the verification, the verification status is available in a history record associated with the candidate. In one embodiment, only a system administrator may be authorized to see the set of targets who had previously verified the profile information of the candidate. In such a situation the bank authority can check only the verification status and last verified date and issue request for verification (New/Renewal). Further, multiple requesters (or issuing authorities such as a bank, a passport issuing authority, a job placement authority, and so on) can issue request for fresh verification for any candidate at any point of time.

In one embodiment, the system 200 may be embodied in form of a software application. The issuing authority may install the software application to identify the targets on a crowd sourcing platform. The software application can be one of a mobile app, desktop app, browser app, API or web service integration. A plurality of targets may also install the software application in devices thereof, and may register with the software application to act as targets for profile verification. The system 200 classifies the targets into different categories based on the target-profile information (as illustrated in Table 1) associated with the plurality of targets. In addition to the target-profile information illustrated in Table 1, the target-profile information may also include nature of the business in which a target user are engaged, the place or residence, places frequently visited, and so on. The system 200 identifies certain attributes that can be verified by a set of target. For instance, the system 200 may classify all the targets who may interact with the candidate in relation to the address of the user into the set of target that can verify the address of the candidate i.e. a set of targets in relation to the address of the new user are grouped as a set of target users associated with the address attribute. It will be noted that the system can categorize the set of targets for screening of multiple attributes of the candidate. Such multiple attributes can be combined into one subset-profile so that the set of targets can screen the subset-profile information of the candidate for verification purposes. It will also be noted that immediate family could be a participant of crowd sourcing platform. However, the system 200 would not consider the candidate or immediate family in the set of target users for the purpose of identity or address verification.

In one embodiment, the profile information of the candidate is divided into a set of profile fragments by the system 200. Further, each subset-profile is generated based on one or more attributes selected from the profile fragments. In this example, a subset-profile containing the attributes "address of the user" and "user present at home" can be clubbed together to form a subset-profile.

In order to verify this subset-profile, the system 200 determines the set of target through a random allotment mechanism based on the natural interactions of the target users with the new user in the physical world. The system 200 performs a ready lookup for a quick reference for a target user with verified KYC. The target users are selected based on recent verification update for one-off or high value transactions by non-bank account holders for drafts, remittances and the like. This system 200 could be extended to verification of medical history, criminal records, credit history, and so on. For instance, in the present situation, a food delivery boy, a friend, and a grocery store keeper may be identified as a set of target users who can verify the address attribute associated with the user, since these target users are physically visiting the address of the new user for some reason or the other at different time of the week. Further, the set of targets may also include non-human entities such as a webcam fitted in the society in which the new user claims to stay webcam at the grocery store which may capture the new users photograph in order to verify his photograph given in the profile details. The non-human entities may also include driverless cars, intelligent billboards, surveillance devices, cameras or drones. In the next step, a set of questions corresponding to the address micro profile are generated by the system 200. The set of questions may include challenge-response based questions for verifying the address subset-profile of the candidate. This set of targets is then prompted with these different challenge based questions depending on their location and the address provided by the new user. The challenge based questions may include picture, text, Yes/No, Multiple choice, vote, partial data entry type questions. For example—send/upload selfie of a food delivery boy with customer.

In this embodiment, the food delivery boy may be asked with a question asking the society name of the candidate's address. Further, the friend of the user may be asked to verify the flat number of the new user and the like. In one embodiment, the multiple questions are created with different complexity level such as simple, medium, or hard and assigned to different target users.

Examples of various questions (or queries) corresponding to various attributes, that may be provided for verification to the set of targets may include:
For attribute A1, and verification parameters P2-P10:
Target type: online map/directory service
Sample Question: What is the distance from {A} to {B} located near {landmark} by car/public transit?

Outcome:
Verification completed: P2-P10
Verification Pending: P1. Door numbers information not available in online map/directory service.
Verification Completeness: 90%
   For attributes A1, A3, for verification parameters P1-P10:
Target type: Human
Sample Question: What is the name on the mailbox at address (Address)?
Outcome:
Verification completed: P1-P10, P21-23
Verification Pending: None
Verification Completeness: 100%
   For attribute A2, for verification parameters P11-P20:
Target Agent type: online map/directory service
Sample Question: Where is this address located in (City)
Outcome:
Verification completed: P11-P20
Verification Pending: None
Verification Completeness: 100%
   For attributes A3, A4, for verification parameters P21-P29:
Target type: Human
Sample Question: Please select the name of the person {display photo} whose credit card number ends with **  ** 4327 to complete the payment transaction at your point of sale (POS).
Answer Options. Williams Carl, Bruce David, Thornton Bill, Philips Luke, None of these
Outcome:
Verification completed: P21-P29
Verification Pending: None
Verification Completeness: 100%

After receiving response from the set of target the system 200 enables verification of the subset profile containing the address, by comparing the subset profile information with the inputs received from the set of target. For this purpose, initially system 200 aggregates all the inputs received from the food delivery boy, the user's friend and the grocery store keeper against the candidate. The inputs are normalized and aggregated. The aggregated inputs are compared based upon an average mean value of the subset-profile for verifying profile data provided by the candidate. Further, it should be noted that as part of this crowdsourcing engagement, a candidate's online/social identities could be new information that could be gathered which could be updated in the system 200. If many target users are able to corroborate the newly gathered information, system 200 could be considered as a source of new verified information. These could be used to create additional subset profiles during future requests for verification. Further, the system 200 is enabled to generate verification report corresponding to the address subset-profile of the candidate based on the comparison between subset-profile and the corresponding inputs received from the set of target user. In a similar manner, all the subset-profiles from the set of subset-profiles associated with the candidate are analysed using the crowd sourcing platform for verifying the profile data associated with the candidate. The aggregated responses are tagged to a specific profile date/timestamp and sent to the processor which employs a mathematical model to compute a score based on the responses. In an embodiment, said score can be used to determine if the subset profile information (for example, the address) being verified can be processed or a physical verification is further required or not. Accordingly, the processor places the request in the workflow of a field officer. The system 200 also employs learning algorithms such as linear regression to build its knowledge base and enhance its calculation accuracy.

In one embodiment, the crowd sourced verification disclosed herein is not limited only to verification of identity of individuals. The crowd sourced verification could be extended for Small and Medium Enterprises (SMEs), business, corporate, partnership firms, business entities, firms, and companies. Many banks rely on third party certification or intermediaries to verify customer when it comes to Alien, Non-Resident Accounts and for cross-border parties.

Although implementations of system and method for verification of identity of a user, it is to be understood that the appended claims are not necessarily limited to the specific features or methods described herein. However, the specific features and methods are disclosed as examples of implementations for verifying the identity of a candidate.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:
1. A processor-implemented method for candidate profile screening comprising:
   receiving, via one or more hardware processors, a request for screening of a candidate profile associated with a candidate, the candidate profile comprising a plurality of candidate profile attributes;

dividing, via the one or more hardware processors, the candidate profile into a plurality of subset-profiles, each subset-profile comprising subset-profile information associated with one or more candidate profile attributes of the plurality of candidate profile attributes, wherein a candidate profile attribute of the plurality of candidate profile attributes comprises a plurality of verification parameters, and wherein a verification parameter of the plurality of verification parameters is associated with an importance rating and a sensitivity level, wherein the importance rating of the verification parameter indicative of relevance of the verification parameter to determine if the verification parameter is mandatory for verification of the subset-profile information, and wherein the sensitivity level associated with the verification parameter indicative of sensitivity of subset-profile information associated with the verification parameter; and validating, via the one or more hardware processors, the subset-profile information of one or more subset-profiles of the plurality of subset-profiles, wherein validating the sub-set profile information of a subset-profile comprises:

mapping the subset-profile information associated with the plurality of subset-profiles with target-profile information of a plurality of targets to identify a set of targets from amongst the plurality of targets, a target of the set of targets capable of screening the subset-profile information of the one or more subset-profiles, the target-profile information comprising at least one of real-time information and contextual information of the plurality of targets, wherein a target of the plurality of targets comprises one of a hand-held device and a fixed device, and wherein the contextual information of the target being the hand-held device comprises attributes of registered user of the hand-held device, and wherein the contextual information of the target being the fixed device comprises device information of the fixed device;

provisioning one or more queries to the set of targets to enable the set of targets to perform screening of the subset-profile information;

receiving one or more responses to the one or more queries from the set of targets, wherein the one or more responses facilitates in validating the subset-profile information of the candidate profile;

computing an aggregated weightage associated with the one or more responses received from the set of targets, the aggregated weightage computed based at least on an extent of matching of the one or more responses with the one or more candidate profile attributes of the subset-profile information and a confidence score associated with each target of the set of targets; and comparing the aggregated weightage with a threshold value of the aggregated weightage to identify the subset-profile information as one of a valid information and an invalid information.

2. The method of claim 1, further comprising receiving at least one trigger notification prior to provisioning the one or more queries to the set of targets, the at least one trigger notification notifying availability of the subset-profile information associated with the subset-profile, the at least one trigger notification generated based on at least one of the plurality of candidate profile attributes and an attribute-related activity of the candidate.

3. The method of claim 1, wherein the attributes of the registered user of the hand-held device comprises static target attributes, dynamic target attributes, target verification parameters, and target constraints, and wherein the target constraints comprises multi-level constraints, the multi-level constraints being selectively applied to the plurality of targets for identifying the set of targets.

4. The method of claim 3, wherein identifying the set of targets comprises:

associating the contextual information of the plurality of targets with the plurality of verification parameters of the subset-profile information based on a plurality of mapping rules, identifying a plurality of lists of targets from the plurality of targets based on associating, each list of the plurality of lists comprising one or more targets capable of screening one or more verification parameters of the plurality of verification parameters;

computing degree of acquaintances between each target of the plurality of lists of targets based on a frequency of occurrence of said targets in the plurality of lists; and selecting the set of targets from the plurality of lists of targets based on a comparison of the degree of acquaintances with a plurality of threshold values of the degree of acquaintance, the plurality of threshold values defining a range of the degree of acquaintance, the plurality of threshold values comprising at least an upper level of the degree of acquaintance and a lower level of the degree of acquaintance.

5. The method of claim 1, wherein the confidence score associated with a target is indicative of a probability of accuracy of responses provided by the target, and wherein the confidence score is computed based on at least one of past history of responses provided by the target, promptness in providing the responses, correctness of the responses, and difficulty level of previous queries assigned to the target.

6. The method of claim 1, wherein computing the aggregated weightage comprises:

assigning individual weightages to each of the one or more responses received from the each target of the set of targets based at least on an extent of matching of the one or more responses with the one or more attributes of the subset-profile information and the confidence score associated with each target; and computing an average mean value of the individual weightages to obtain the aggregated weightage.

7. The method of claim 1, wherein identifying the subset-profile information as the invalid information comprises detecting an anomaly in the subset-profile information on determination of the aggregated weightage being less than the threshold value of the aggregate weightage, and wherein identifying the subset-profile information as the valid information comprises determining the aggregated weightage as greater than or equal to the threshold value of the aggregate weightage.

8. A processor-implemented system for candidate profile screening, the system comprising:

at least one memory storing instructions; and one or more hardware processors coupled to said at least one memory, wherein the one or more hardware processors configured by said instructions to:

receive a request for screening of a candidate profile associated with a candidate, the candidate profile comprising a plurality of candidate profile attributes;

divide the candidate profile into a plurality of subset-profiles, each subset-profile comprising subset-profile information associated with one or more candidate profile attributes of the plurality of candidate profile attributes, wherein a candidate profile attribute of the plurality of candidate profile attributes comprises a plurality of verification parameters, and wherein a verification parameter of the plurality of verification parameters is associated with an importance rating and a sensitivity level, wherein the importance rating of the verification parameter indicative of relevance of the verification parameter to determine if the verification parameter is mandatory for verification of the subset-profile information, and wherein the sensitivity level associated with the verification parameter indicative of sensitivity of subset-profile information associated with the verification parameter; and validate the sub-set profile information of one or more subset-profiles of the plurality of subset-profiles, wherein to validate the sub-set profile information of a subset-profile, the one or more hardware processors are configured by said instructions to:

map the subset-profile information associated with the plurality of subset-profiles with target-profile information of a plurality of targets to identify a set of targets from amongst the plurality of targets, a target of the set of targets capable of screening the subset-profile information of the one or more subset-profiles, the target-profile information comprising at least one of real-time information and contextual information of the plurality of targets, wherein a target of the plurality of targets comprises one of a hand-held device and a fixed device, and wherein the contextual information of the target being the hand-held device comprises attributes of registered user of the hand-held device, and wherein the contextual information of the target being the fixed device comprises device information of the fixed device;

provision one or more queries to the set of targets to enable the set of targets to perform screening of the subset-profile information;

receive one or more responses to the one or more queries from the set of targets, wherein the one or more responses facilitates in validating the subset-profile information of the candidate profile;

compute an aggregated weightage associated with the one or more responses received from the set of targets, the aggregated weightage computed based at least on an extent of matching of the one or more responses with the one or more candidate profile attributes of the subset-profile information and a confidence score associated with each target of the set of targets; and compare the aggregated weightage with a threshold value of the aggregated weightage to identify the subset-profile information as one of a valid information and an invalid information.

9. The system of claim 8, said one or more hardware processors are further configured by the instructions to receive at least one trigger notification prior to provisioning the one or more queries to the set of targets, the at least one trigger notification notifying availability of the subset-profile information associated with the subset-profile, the at least one trigger notification generated based on at least one of the plurality of candidate profile attributes and an attribute-related activity of the candidate.

10. The system of claim 8, wherein the attributes of the registered user of the hand-held device comprises static target attributes, dynamic target attributes, target verification parameters, and target constraints, and wherein the target constraints comprises multi-level constraints, the multi-level constraints being selectively applied to the plurality of targets for identifying the set of targets.

11. The system of claim 10, wherein to identify the set of targets, said one or more hardware processors are further configured by the instructions to:

associate the contextual information of the plurality of targets with the plurality of verification parameters of the subset-profile information based on a plurality of mapping rules, identify a plurality of lists of targets from the plurality of targets based on associating, each list of the plurality of lists comprising one or more targets capable of screening one or more verification parameters of the plurality of verification parameters;

compute degree of acquaintances between each target of the plurality of lists of targets based on a frequency of occurrence of said targets in the plurality of lists; and select the set of targets from the plurality of lists of targets based on a comparison of the degree of acquaintances with a plurality of threshold values of the degree of acquaintance, the plurality of threshold values defining a range of the degree of acquaintance, the plurality of threshold values comprising at least an upper level of the degree of acquaintance and a lower level of the degree of acquaintance.

12. The system of claim 8, wherein the confidence score associated with a target is indicative of a probability of accuracy of responses provided by the target, and wherein the confidence score is computed based on at least one of past history of responses provided by the target, promptness in providing the responses, correctness of the responses, and difficulty level of previous queries assigned to the target.

13. The system of claim 8, wherein to compute the aggregated weightage, said one or more hardware processors are further configured by the instructions to:

assign individual weightages to each of the one or more responses received from the each target of the set of targets based at least on an extent of matching of the one or more responses with the one or more attributes of the subset-profile information and the confidence score associated with each target; and compute an average mean value of the individual weightages to obtain the aggregated weightage.

14. The system of claim 8, wherein to identify the subset-profile information as the invalid information, one or more hardware processors are further configured by the instructions to detect an anomaly in the subset-profile information on determination of the aggregated weightage being less than the threshold value of the aggregate weightage, and wherein to identify the subset-profile information as the valid information one or more hardware processors are further configured by the instructions to determine the aggregated weightage as greater than or equal to the threshold value of the aggregate weightage.

15. A non-transitory computer-readable medium having embodied thereon a computer program for executing a method for screening candidate profile, the method comprising:

receiving a request for screening of a candidate profile associated with a candidate, the candidate profile comprising a plurality of candidate profile attributes;

dividing the candidate profile into a plurality of subset-profiles, each subset-profile comprising subset-profile information associated with one or more candidate profile attributes of the plurality of candidate profile attributes, wherein a candidate profile attribute of the plurality of candidate profile attributes comprises a plurality of verification parameters, and wherein a verification parameter of the plurality of verification parameters is associated with an importance rating and a sensitivity level, wherein the importance rating of the verification parameter indicative of relevance of the verification parameter to determine if the verification parameter is mandatory for verification of the subset-profile information, and wherein the sensitivity level associated with the verification parameter indicative of sensitivity of subset-profile information associated with the verification parameter; and validating the sub-set profile information of one or more subset-profiles of the plurality of subset-profiles, wherein validating the sub-set profile information of a subset-profile comprises:

mapping the subset-profile information associated with the plurality of subset-profiles with target-profile information of a plurality of targets to identify a set of targets from amongst the plurality of targets, a target of the set of targets capable of screening the subset-profile information of the one or more subset-profiles, the target-profile information comprising at least one of real-time information and contextual information of the plurality of targets, wherein a target of the plurality of targets comprises one of a hand-held device and a fixed device, and wherein the contextual information of the target being the hand-held device comprises attributes of registered user of the hand-held device, and wherein the contextual information of the target being the fixed device comprises device information of the fixed device;

provisioning one or more queries to the set of targets to enable the set of targets to perform screening of the subset-profile information;

receiving one or more responses to the one or more queries from the set of targets, wherein the one or more responses facilitates in validating the subset-profile information of the candidate profile;

computing an aggregated weightage associated with the one or more responses received from the set of targets, the aggregated weightage computed based at least on an extent of matching of the one or more responses with the one or more candidate profile attributes of the subset-profile information and a confidence score associated with each target of the set of targets; and comparing the aggregated weightage with a threshold value of the aggregated weightage to identify the subset-profile information as one of a valid information and an invalid information.

\* \* \* \* \*